Aug. 30, 1966        K. KUCHENBECKER        3,269,359
TRIPLE GRATE FEEDING GUARD
Filed Oct. 18, 1965                          3 Sheets-Sheet 1
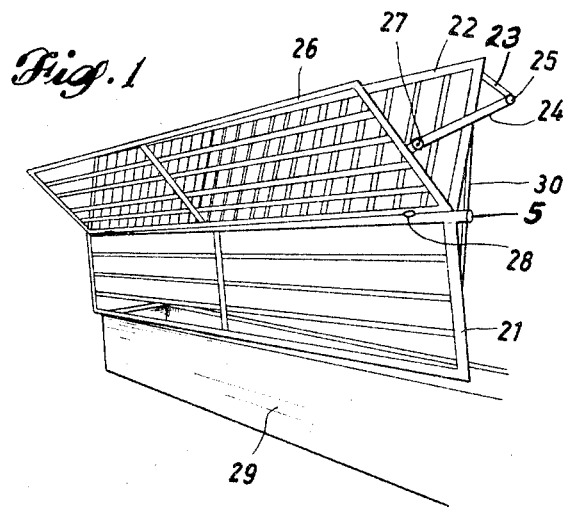
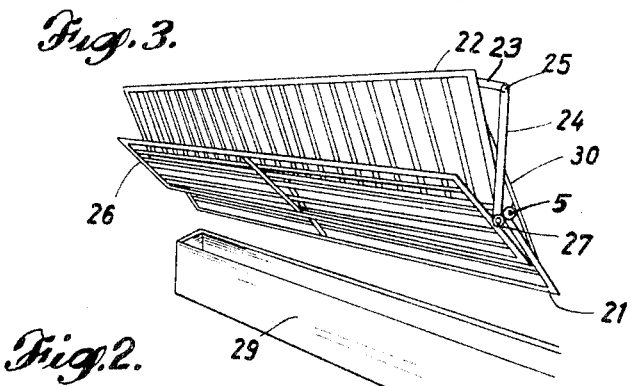
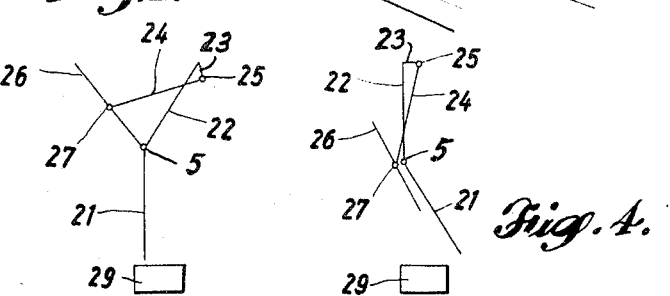
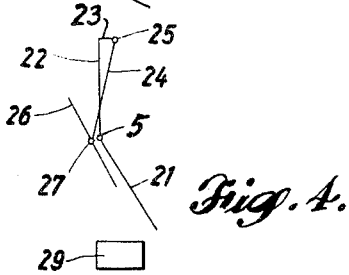
Inventor:
KARL KUCHENBECKER
By Robert W. Beach
ATTORNEY Aug. 30, 1966  K. KUCHENBECKER  3,269,359
TRIPLE GRATE FEEDING GUARD
Filed Oct. 18, 1965  3 Sheets-Sheet 2

INVENTOR.
KARL KUCHENBECKER
BY
Robert W. Beach
ATTORNEY

Aug. 30, 1966   K. KUCHENBECKER   3,269,359
TRIPLE GRATE FEEDING GUARD
Filed Oct. 18, 1965   3 Sheets-Sheet 3

INVENTOR.
KARL KUCHENBECKER
BY
Robert W. Beach
ATTORNEYS

United States Patent Office 3,269,359
Patented August 30, 1966

3,269,359
TRIPLE GRATE FEEDING GUARD
Karl Kuchenbecker, Zuckerberg 29, Trier, Germany
Filed Oct. 18, 1965, Ser. No. 497,317
12 Claims. (Cl. 119—59)

This application is a continuation-in-part of my application Serial No. 323,432 filed November 13, 1963, for Feeding Guard.

The present invention relates to agricultural stable equipment and more particularly to a feeding guard which is mounted in the vicinity of a feeding trough and serves for screening the stalls of the animals from the feeding trough or feeding passage.

Such feeding guards are frequently used for preventing stabled animals, especially cattle, from reaching the feeding trough or feeding rack except during feeding time. During this time, these known feeding guards are opened so that the animals can feed, preferably separately and without disturbing each other. It is also known to provide such rigid feeding guards with separate feeding racks which permit the animals at the same time to be fed with beets or the like from the feeding trough and with hay from the feeding rack.

On many farms or in other agricultural establishments it has been found advisable to use the stables during different seasons of the year for different animals, for example, for cattle as well as for pigs or sheep. This results in considerable economic advantage since the stable area can then always be fully utilized. Thus, for example, in summer when the cattle remain outside in the pasture, the stable may be used for raising pigs. Such a multi-purpose use of the stable also has the advantage that the agricultural operation may be quickly changed in accordance with changing market conditions.

For the mentioned purpose of utilizing the stable for different animals which are kept in stalls and held in place by the conventional feeding guards, it has already been proposed to provide the upper half of the feeding guard with openings which may be closed up, while the lower half has unchangeable feeding slots and may be tilted upwardly about a horizontal axis relative to the upper part in the direction toward the feeding passage. Such a feeding guard has, however, the disadvantage that it requires a complete reconstruction of the stable and that it can therefore not be employed if the stable is already equipped with means for tethering the animals in any other manner.

In order to permit such stables in which the cattle are either tethered by chains or neck yokes, or simple pens, open stables or the like to be used for different purposes, the present invention provides a feeding guard for stables for screening off the feeding trough or the feeding passage from the stable area, which comprises a grate wall that is swingable about an axis located above and parallel to the trough and may be locked in any position to which it is turned. This axis of rotation may extend through the plane of the grate wall so as to divide it into two equal or unequal parts which may be swiveled relative to each other and locked in various adjusted positions. It is for this purpose advisable to mount above the trough a horizontal shaft which carries a main grate, an auxiliary grate, which are either rigidly connected to each other or may be swiveled relative to each other, and a secondary grate mounted adjustably relative to such main grate and auxiliary grate. Such a feeding guard may be easily installed also in such stables in which previously there have been no means for screening off the stable area from the feeding passage and in which the animals are tethered individually.

The shaft carrying the grate which forms the feeding guard may be rotatably mounted either on extensions of the stands forming the stalls, or on stable posts, stable walls, or other mounting means, or also on special supporting stands or the like. Each of the grate parts consists of several parallel grate rods which are secured within a frame. The main grate should be adjustable to, and adapted to be locked in, at least two positions. The secondary grate may be mounted to be tilted relative to the main grate so as to extend at an angle thereto. The secondary grate may be swiveled about an axis which extends parallel to the grate wall.

Preferably the secondary grate is swingably mounted on arms which are connected to the upper part of the grate wall, preferably to the auxiliary grate, and the secondary grate may be disengageable from the grate wall. The axis of rotation of the secondary grate is preferably located near its center so as to permit it to be swiveled very easily. The secondary grate should also be provided with means to permit it to be supported relative to the grate wall in a position in which the secondary grate and the upper part of the grate wall, or the auxiliary grate, extend at an angle to each other so that both together may form a feeding rack.

FIGURE 1 is a perspective view of a stall having a feeding guard according to the invention in a position in which the animals can reach the feeding trough, and the secondary grate and the upper part of the grate wall form a feeding rack, and FIGURE 2 is an end elevation diagram showing the feeding guard in the same position.

FIGURE 3 is a view similar to FIGURE 1 of the same feeding guard but in another position in which the feeding trough is shut off from the stall of the animals and the secondary grate rests against the grate wall, and FIGURE 4 is an end elevation diagram showing the feeding guard in the same position.

Figure 9:
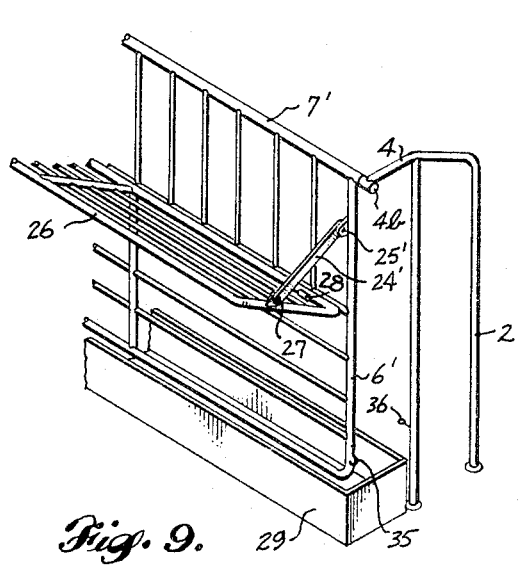
Figure 10:
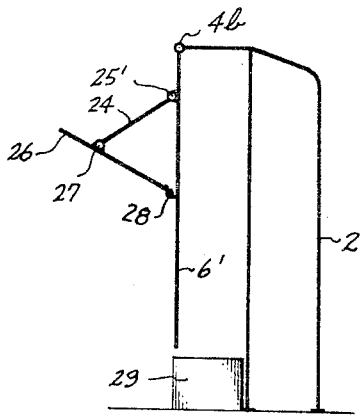
Figure 11:
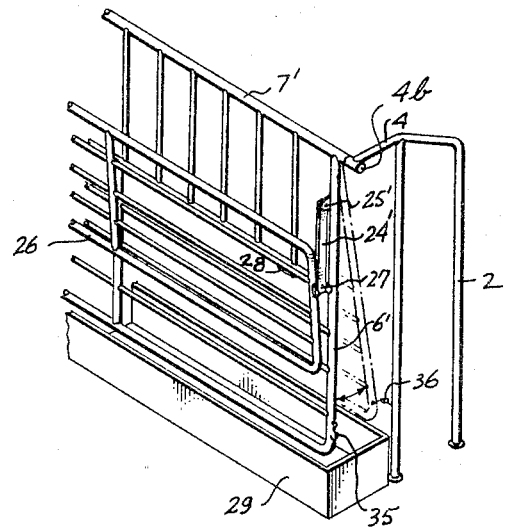
Figure 12:
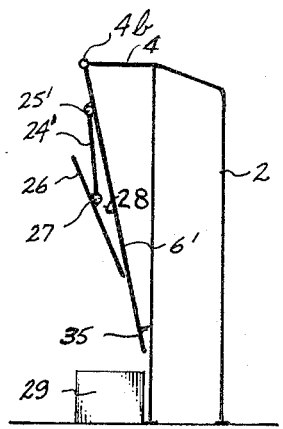

FIGURE 9 is a top perspective of still a different type of grate and feed trough construction, and FIGURE 10 is an end elevation diagram showing the grate in the same position. FIGURE 11 is a top perspective of the same type of grate and feed trough with parts shown in a different position of adjustment, and FIGURE 12 is an end elevation diagram showing the grate parts in the same relationship but swung to a different position.

As illustrated in FIGURES 5 to 12, the stalls for the animals have a feeding trough 29 with a filling side at the left and a stock-feeding side at the right. Posts 2 form the lateral limitations of each stall. These posts, not shown in FIGURES 1 to 4, have arms 4 which extend toward the feeding trough and carry a horizontal shaft 5 which is mounted on the ends 4a of these arms 4. In FIGURES 1 to 4, inclusive, this horizontal shaft 5 carries a feeding guard including a grate wall which consists of a lower main grate part 21 and an upper auxiliary grate part 22. Both grates may consist of a plurality of parallel rods combined into a unit by a frame. The parallel rods of the main grate part 21 are shown as extending horizontally and the parallel rods of the auxiliary grate part 22 extend vertically. Such grate parts 21 and 22 are shown as being connected together rigidly at an angle to each other, as indicated particularly in FIGURES 1 and 3. This entire grate wall is mounted so as to be rotatable about shaft 5.

By rotation about shaft 5 within a range of 360°, it is possible to swivel the feeding guard 21, 22 about the axis of such shaft to any desired position above the feeding trough 1. Thus, for example, in FIGURE 1 and FIGURE 2 the main grate 21 is turned vertically downward while in FIGURE 3 it is turned slightly upward toward the feeding passage.

The auxiliary grate 22 in FIGURES 1, 2 and 3 is mounted rigidly with the main grate 21 on shaft 5, extending from the shaft in the direction generally opposite the main grate. Thus, the main grate 21 and the auxiliary grate 22 are swung together as the main grate is adjusted to various swung positions.

Both ends of the upper or auxiliary grate part 22 carry pivots 25 either directly on the upper grate part or supported near it by lateral arms 23. Links 24 are connected to such pivots by one end. The other ends of these links are pivotably connected to a secondary grate 26 by pivots 27. Such secondary grate may be swiveled about pivots 27 to any position within an angle of 360°. The axis of pivots 27 of this secondary grate is preferably located substantially at the center of such grate.

The grate parts 21 and 22 of the grate wall and the secondary grate 26 may have either vertical or horizontal grate bars. However, they may also consist of frames which carry wire screens or the like.

For supporting the secondary grate 26, the continuous shaft 5 of the grate wall is provided near its ends with short projections 28 forming stops which hold the auxiliary grate in a fixed position relative to the grate 21, 22 when it is tilted as shown in FIGURE 2.

One particular advantage of the feeding guard according to the invention is the fact that it considerably facilitates the feeding of cattle in the stable. This will be clearly apparent especially from the diagrammatic sketches of the preferred positions of adjustment of the main and auxiliary grates according to FIGURES 2 and 4. Generally the feeding guard is in the position as shown in FIGURE 3 or FIGURE 4 in which the main grate hangs downwardly. It may be locked in either of these positions or be freely movable. The smaller auxiliary grate is rigidly connected to the main grate and extends in the upward direction. The cattle will be prevented by the auxiliary grate from stepping forwardly and into the feeding trough or toward the feeding passage. Not being able to step out of their stall, they will be quieted generally.

When feeding time comes, the main or lower grate section 21 will be disposed in the position shown in FIGURES 3 and 4 so that such grate section is disposed at the stock-feeding side of the trough and the feeding trough will be entirely free for deposit of feed in it. When hogs are kept in the stall and are to be fed, their feed and swill may be poured into the feeding trough when the grate is in this position, while when cattle are to be fed their concentrated feed may be poured into the trough. The secondary grate 26 at this time may be in the position of FIGURE 4 relative to the upper auxiliary grate 22.

When the animals should start feeding the main or lower grate section 21 is swung back to the feeding position at the filling side of the trough as shown in FIGURE 2 to enable the animals to feed from the trough 1 as well as from the feed rack.

After the animals have eaten up their wet fodder, the lower main grate 21 can be swung from the position of FIGURE 2 to the position of FIGURE 4 and the secondary grate can be raised and swung about its pivots 27 so that the hay drops down into the feeding trough 1. Thereafter the main grate 21 is swung back to its position of FIGURES 1 and 2 to enable the animals again to have access to the trough 1.

When the animals have finished feeding and the feeding trough 1 and the feed rack 22, 26 are to be cleaned, first the grate wall 21, 22 is swung slightly toward the inside so that the lower grate part 21 is tilted slightly upwardly and the upper grate part 22 assumes an approximately vertical position, as indicated in FIGURES 3 and 4. The feeding trough 1 is then no longer accessible to the animals and it may be easily cleaned from the side of the feeding passage without any interference by the feeding guard.

As regards the weight distribution, the grate wall including the secondary grate are designed so that the swinging movement of the grate wall as well as the engagement and disengagement of the secondary grate may be carried out very easily. It then only requires a few manipulations to move the feeding guard from a position as indicated in FIGURES 3 and 4 back to a position according to FIGURES 1 and 2 in order to be ready for the next feeding.

The upper and lower parts 22 and 21 of the grate wall may be connected to each other by rods 30 to reinforce the grate structure.

It is advisable to construct the new feeding guard so as to extend across the ends of several stalls. In order to facilitate the swiveling of the main grate, it is possible to mount the shaft 5 in roller or ball bearings. Each end of the grate is preferably provided with a control lever which may be provided similarly to a switch lever of a railroad switch with a weight serving as a counterweight to compensate for the weight of the grate.

Figure 5:
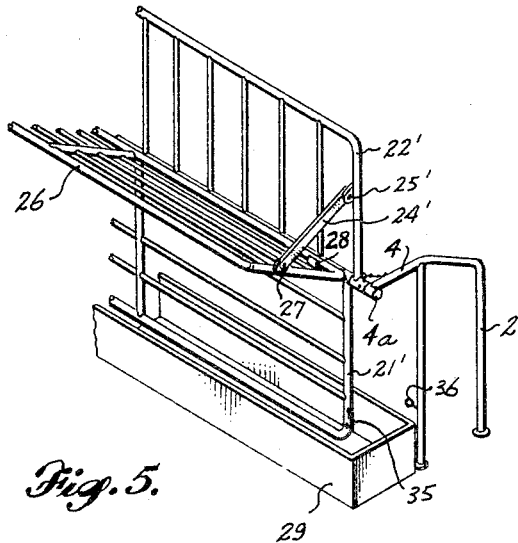
FIGURE 5 is a top perspective of an alternative type of feeding trough and grate arrangement, with parts in one position.
Figure 6:
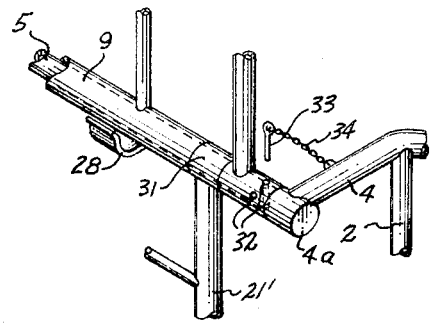
FIGURE 6 is a top perspective of a detail of such arrangement.

A similar type of feeding guard is shown in FIGURES 5, 6, 7 and 8, but in this instance the main grate part 21' and the auxiliary grate part 22' are not connected together ragidly as in the feeding guard shown in FIGURES 1 and 3, but, on the contrary, these two parts are pivotally connected for relative swinging such as by tubes at the margins of such grate parts being rotatively mounted on the stationary shaft 5 integral with the ends 4a of arms 4. A detail of such a construction is shown in FIGURE 6 in which the tube 9 forming one margin of the auxiliary grate section 22' is rotatively mounted on the stationary shaft 5. Sleeves 31 carried by the ends of the legs of the main grate 21' are also rotatively mounted on this shaft.

The auxiliary grate 22' can be connected rigidly to the fixed shaft 5 by any suitable means, such as by providing holes 32 in the tube 9, either of which can be aligned with a hole extending diametrically through the shaft 5. The auxiliary grate can then be held in selected swung positions relative to the shaft 5 by inserting a locking pin 33 through a selected hole 32 and the hole in shaft 5 in registry therewith. The locking pin may be attached to the arm 4 by a chain 34 so that the pin will always be available for use. Thus, when the main grate 21' is in depending position, the auxiliary grate 22' can be secured in the same plane extending upward from the main grate, as shown in FIGURES 5 and 6. The cattle will then be prevented by the auxiliary grate from stepping forward into the feeding trough or toward the feeding passage. Not being able to step out of their stall, they will be quieted, generally.

Figure 7:
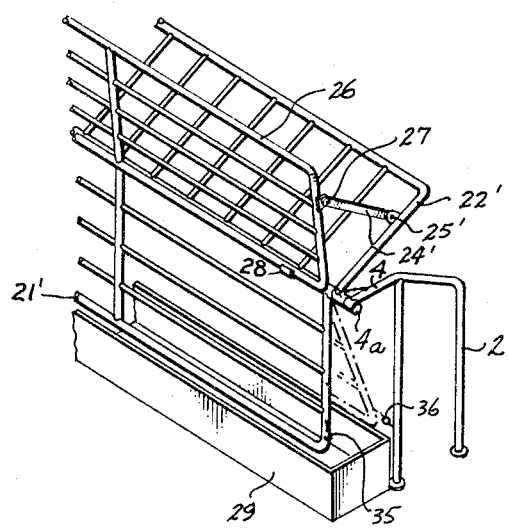
FIGURE 7 is a top perspective of such trough parts in a different position.
Figure 8:
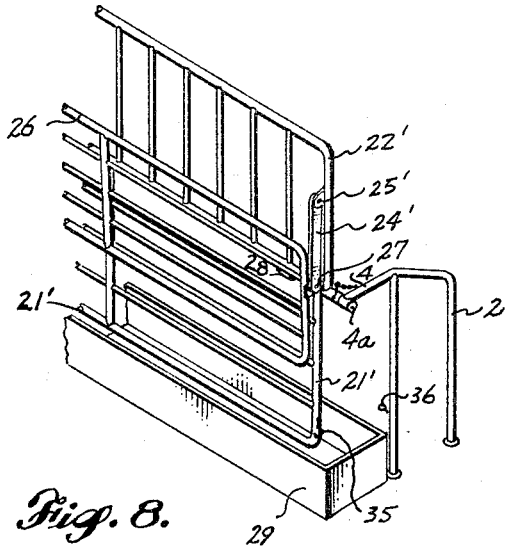
FIGURE 8 is a similar view with parts shown in still a different position of adjustment.

When feeding time comes, the main grate section 21' is swung slightly toward the animals, for example, to the broken-line position shown in FIGURE 7, in which position the grate can be retained by engaging a hook 35 on the grate with an eye 36 on a post. With the main grate section disposed at the stock-feeding side of the trough, the feeding trough will be entirely free for deposit of feed in it. After such deposit of feed the hook 35 can be released so that the grating will swing back into the upright position at the aisle side of the trough. If it is desired to provide hay for the animals, the secondary grate 26 can be swung about pivots 27 on link 24' and raised by upward swinging of such links about pivot 25' on the auxiliary grate 22' so that one edge of the secondary grate can be lodged in short hooks or projections 28, as shown in FIGURE 5. If it is desired for such hay to be made more readily available to animals of short stature, the auxiliary grate 22' and the secondary grate 26 can be swung conjointly about shaft 5 and the auxiliary grate secured by pin 33 in the position shown in FIGURE 7.

When the animals have finished feeding, the lower grate part 21' can be swung back to the broken-line position shown in FIGURE 7 and secured in that position by the hook 35 and eye 36 so that the feed trough can be cleaned. The hay rack can be emptied into the feed trough by lowering the secondary grate 26 to the relationship to the auxiliary grate 22' shown in FIGURE 8 by releasing the marginal member of the secondary grate from the projections or hooks 28.

The embodiment of the invention according to FIGURES 1 to 4 inclusive employing a secondary grate may be modified without any substantial change in the function of the feeding guard by shifting the position of the grate-swinging axis defined by shaft 5 of the grate wall 21, 22 to the upper edge thereof, as shown in FIGURES 9 to 12. In this instance, the lower main grate having horizontal bars and the upper auxiliary grate having vertical bars form a single grate wall 6' in which the auxiliary grate and the main grate are coplanar. Such grate sections could, of course, be disposed at an angle to each other as are the grate sections 21 and 22 shown in FIGURES 1 to 4.

In this instance the upper marginal member 7' of the grate wall is pivotally supported by the ends 4b of the arms 4 so that the grate can swing between the vertical position shown in FIGURE 10 and in solid lines in FIGURES 9 and 11 and the position swung toward the stock shown in broken lines in FIGURE 11 and diagrammatically in FIGURE 12. The grate can be held in this swung position, in which the stock is barred from access to the feeding trough 29, by a hook 35 engaged with an eye 36. The main grate can be swung between these two positions for purposes described above in connection with the other forms of device illustrated.

In the feeding guard shown in FIGURES 9 to 12, inclusive, a secondary grate 26 is provided which is generally of the type previously described and is supported by a link 24' connected by a pivot 25' to the auxiliary and main grates. The pivot 27 connects such link and the secondary grate so that such grate can be shifted between a hayrack-forming position shown in FIGURES 9 and 10 having one edge supported by hooks 28 and the inoperative position shown in FIGURES 11 and 12. This manipulation has also been discussed above in connection with the other forms of guard.

I claim as my invention:

1. A stock-feeding device for use in a stable comprising a stationary feed trough having a stock-feeding side and a filling side, upright grate means, grate-mounting means supporting said upright grate means generally in an upright plane over said feed trough with the lower edge of said upright grate means located closely adjacent to the upper portion of said feed trough, means guiding said upright grate means for swinging of its lower edge between positions at the stock-feeding side of said trough and at the filling side of said trough, secondary grate means, and means supporting said secondary grate means from said upright grate means in a position adjacent to said upright grate means and diverging upwardly from said upright grate means for defining a hayrack between said secondary grate means and the upper portion of said upright grate means.

2. The stock-feeding device defined in claim 1, in which the means supporting the secondary grate means includes linkage pivotally connected to the upright grate means and to the secondary grate means and guiding the secondary grate means for swinging relative to the upright grate means, and disengageable means spaced from said linkage means and engageable between the upright grate means and the secondary grate means for positioning the secondary grate means and the upright grate means in conjunction with said linkage means in upwardly diverging relationship.

3. The stock-feeding device defined in claim 2, in which the linkage means are operable to guide the secondary grate means for bodily swinging relative to the upright grate means from an upwardly diverging relationship into a generally parallel relationship when the disengageable means are disengaged.

4. The stock-feeding device defined in claim 3, in which the linkage means are pivotally connected to the secondary grate means at a location between opposite edges of the secondary grate means.

5. The stock-feeding device defined in claim 4, in which the linkage means are pivotally connected to the secondary grate means at a location approximately midway between opposite edges of the secondary grate means.

6. The stock-feeding device defined in claim 2, in which the disengageable means include hook means.

7. The stock-feeding device defined in claim 6, in which the hook means are mounted on the upright grate means for engagement with an edge portion of the secondary grate means.

8. The stock-feeding device defined in claim 1, in which the upright grate means include upper and lower sections and the secondary grate means are supported from the upper section of the upright grate means.

9. The stock-feeding device defined in claim 8, in which the upper and lower sections of the upright grate means are rigidly connected together for conjoint swinging.

10. The stock-feeding device defined in claim 9, in which the grate-mounting means includes pivot means adjacent to the upper edge of the upper section of the upright grate means guiding the upper and lower sections of the upright grate means for conjoint swinging.

11. The stock-feeding device defined in claim 8, and hinge means connecting the upper and lower sections of the upright grate means and guiding such sections for relative swinging movement.

12. A stock-feeding device for use in a stable comprising a feed trough, upright grate means, grate-mounting means operable to support said upright grate means generally in an upright plane over said feed trough, secondary grate means, linkage means pivotally connected to said upright grate means and to said secondary grate means and guiding said secondary grate means for swinging relative to said upright grate means, and disengageable means spaced from said linkage means and, in cooperation with said linkage means, connecting said secondary grate means and said upright grate means in relatively upwardly diverging relationship, said linkage means guiding said secondary grate means for swinging relative to said upright grate means into a position generally parallel to said upright grate means upon disengagement of said disengageable means.

References Cited by the Examiner
UNITED STATES PATENTS

| 646,980 | 4/1900 | Goodwin | 119—63 |
| 1,293,972 | 2/1919 | Stockton | 119—63 |

SAMUEL KOREN, *Primary Examiner.*

HUGH R. CHAMBLEE, *Examiner.*